United States Patent [19]

Jardin et al.

[11] 4,296,962
[45] Oct. 27, 1981

[54] WIND DEFLECTOR FOR SLIDING ROOFS OF MOTOR VEHICLES

[75] Inventors: Hans Jardin, Inning; August Hirschberger, Munich, both of Fed. Rep. of Germany

[73] Assignee: Webasto-Werk W. Baier GmbH & Co., Munich, Fed. Rep. of Germany

[21] Appl. No.: 80,022

[22] Filed: Sep. 28, 1979

[30] Foreign Application Priority Data

Sep. 28, 1978 [DE] Fed. Rep. of Germany ... 7828941[U]

[51] Int. Cl.³ .............................................. B60J 7/18
[52] U.S. Cl. ................................... 296/217; 98/2.12; 428/122
[58] Field of Search .............. 296/217, 31 P; 428/122, 428/358, 31; 98/2.12; 52/716, 730, 309.13

[56] References Cited

U.S. PATENT DOCUMENTS

| | | | |
|---|---|---|---|
| 3,156,176 | 11/1964 | Werner | 296/217 |
| 3,836,192 | 9/1974 | Wilfert | 296/31 P |
| 3,973,478 | 8/1976 | Gotz | 296/217 |
| 4,165,120 | 8/1979 | Jardin | 296/217 |

*Primary Examiner*—Robert R. Song
*Attorney, Agent, or Firm*—Craig and Antonelli

[57] ABSTRACT

A wind deflector for sliding roofs of motor vehicles is mountable near the forward edge of a roof opening so as to be swivelable near its forward edge about an axis which runs at right angles to the lengthwise axis of the vehicle and is formed of a sheet metal strip and an overlying plastic strip that is connected thereto. The plastic strip can be connected with the sheet metal strip by either bonding, (e.g., adhesive or ultrasonic welding) shrink-fitting, clips, or the like. According to a preferred embodiment, the plastic strip is formed with internal chambers and is mounted in association with a metal strip so as to present a surface of the plastic strip that is at approximately the same height as an adjacent surface of the metal strip.

14 Claims, 1 Drawing Figure

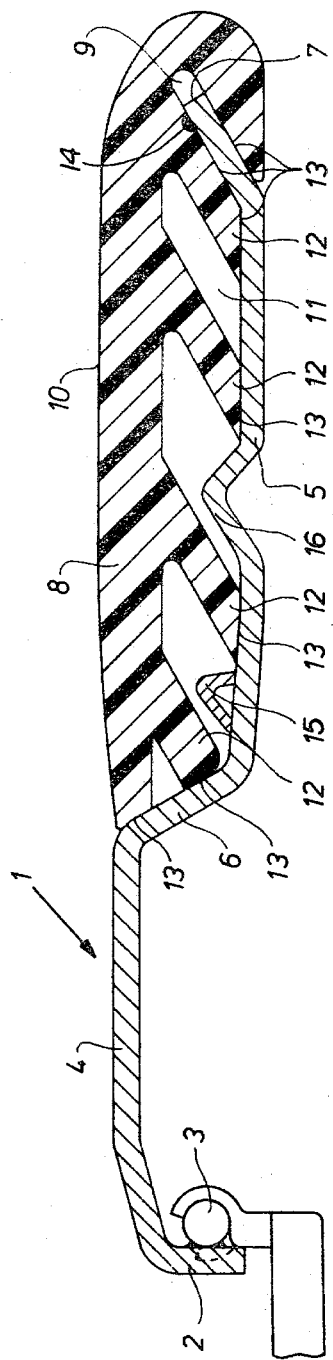

WIND DEFLECTOR FOR SLIDING ROOFS OF MOTOR VEHICLES

BACKGROUND AND SUMMARY OF THE INVENTION

The invention relates to a wind deflector for sliding roofs of motor vehicles, said deflector being mountable near the forward edge of a roof opening and pivotable about an axis extending at right angles to the lengthwise axis of the vehicle and located near its forward edge.

Wind deflectors of this type are made with relatively thick walls to achieve an aerodynamically favorable shape. For this purpose, in a known wind deflector, a sheet metal strip is coated on both sides with PVC. This method of manufacturing a wind deflector is relatively expensive, since large machines are required and the injection process must proceed relatively slowly in order to provide a uniform coating on both sides of the strip. Moreover, it has been found that when the sheet metal strip is extrusion-coated, it is necessary to paint said strip since it is not extrusion-coated at least in the vicinity of its mounting, the paint is occasionally damaged, resulting in a high rejection rate.

An object of the invention is to provide a wind deflector of the type described hereinabove which can be manufactured more cheaply.

This object is achieved according to a preferred embodiment of the invention by virtue of the fact that the wind deflector consists of a sheet metal strip and a plastic strip joined to the latter. The sheet metal strip and the plastic strip are therefore manufactured as separate parts and then joined together. This allows both the sheet metal strip and the plastic strip to be shaped in a manner which favors stability, whereby the thickness of the strips is reduced and the plastic part can be made with recesses, so that the weight of the wind deflector is reduced.

The two parts can be joined by clips, adhesives, ultrasonic welding, or shrinking. It is also possible to design the plastic strip in such manner that it can be mounted on the rear edge of the sheet metal strip. In this case, the rear edge is preferably bent upward.

Preferably, the sheet metal strip comprises two parallel sections separated by a shoulder, one section accepting the plastic strip whose thickness approximately corresponds to the height of the shoulder, so that the surfaces of the plastic strip and of the other section will essentially be flush.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

The sole FIGURE shows a cross-sectional view of a preferred embodiment of a wind deflector in accordance with the invention.

DETAILED DESCRIPTION OF THE PREFERRED EMBODIMENT

The wind deflector consists of a sheet metal strip 1, provided on both sides near its forward edge 2 with a pin 3, said pin serving to mount the wind deflector pivotably in the roof opening of the motor vehicle. Sheet metal strip 1 comprises two parallel sections 4 and 5, connected by a shoulder 6. Section 4, which abuts forward edge 2, is higher than section 5 which is adjacent to rear edge 7. A plastic strip 8 is mounted on rear edge 7, said strip being provided for this purpose with a groove 9 to accept rear edge 7. Plastic strip 8 is located in the depression created by shoulder 6 of section 5 and has a thickness which corresponds approximately to the height of shoulder 6, so that its surface 10 is approximately flush with the surface of section 4 of sheet metal strip 1. Plastic strip 8 is provided with interior chambers or cavities 11, to reduce the weight of the wind deflector.

The plastic strip 8 can be secured to the strip 1 by being glued at surfaces 13 of the ribs 12 of strip 1 formed by chambers 11 and groove 9. Alternatively, the strips 1 and 8 can be joined by clips, ultrasonic welding and/or shrink fitting and the like.

For securing the plastic strip by shrink fitting, the plastic strip is heated at least at its rear end after which it is pushed onto the rear edge 7. When the strip cools, it will clampingly grip the rear edge.

To secure the strip 8 by clips, the metal strip 1 can be provided with one or more projections 14 which engage respective complimentarily shaped recesses in the wall.

Optionally, the metal strip 1 can be stiffened by providing it with one or more reinforcing fins attached thereto (15) or formed by corrugating the sheet metal strip itself (16). The fins extend crosswise of strip 1 and may be arranged in laterally aligned relationship, preferably within the chambers 11.

It should be recognized that multiple variations of the above described features have been shown on a single deflector solely for illustration purposes, a single securing and/or stiffening technique being used normally (although they may be used in combination).

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Wind deflector for sliding roofs of motor vehicles, said deflector being mountable near the forward edge of a roof opening so that it is swivelable near its forward edge about an axis which runs at right angles to the lengthwise axis of the vehicle, and being comprised of a sheet metal strip and an overlying plastic strip connected thereto, characterized by the fact that the plastic strip is mounted upon said sheet metal strip with a rear edge of the sheet metal strip retained within a groove formed in said plastic strip.

2. Wind deflector according to claim 1, characterized by the fact that the rear edge of the sheet metal strip is bent upward.

3. Wind deflector according to claim 2, wherein said rear edge is secured within the plastic strip by shrink-fitting of the plastic strip thereabout.

4. Wind deflector for sliding roofs of motor vehicles, said deflector being mountable near the forward edge of a roof opening so that it is swivelable near its forward edge about an axis which runs at right angles to the lengthwise axis of the vehicle, and being comprised of a sheet metal strip and an overlying plastic strip connected thereto, characterized by the fact that the sheet metal comprises two offset parallel sections separated by a shoulder, the plastic strip being connected to one of said sections and having a thickness approximately the same as the height of the shoulder, so that surfaces of the plastic strip and the other of said sections are essentially flush with one another.

5. Wind deflector according to one of claims 2 to 4, characterized by the fact that the plastic strip is provided with internal cavities separated by ribs.

6. Wind deflector according to claim 4, wherein said bonding is by gluing to end faces of said ribs.

7. Wind deflector according to claim 4, wherein said plastic strip is connected with said sheet metal strip by bonding.

8. Wind deflector according to claim 1 or 4, wherein the plastic strip is secured to the metal strip by clips on the metal strip received within complementarily shaped recesses within the plastic strip.

9. Wind deflector according to one of claims 1 to 4, characterized by the fact that the sheet metal strip is provided with reinforcing fins.

10. Wind deflector according to claim 9, wherein said fins are laterally extending corrugations of the metal strip positioned within chambers formed internally of the plastic strip.

11. Wind deflector according to claim 9, wherein the fins are attached to the metal strip at positions corresponding to chambers formed internally of the plastic strip.

12. Wind deflector for sliding roofs of motor vehicles, said deflector being mountable near the forward edge of a roof opening so that it is swivelable near its forward edge about an axis which runs at right angles to the lengthwise axis of the vehicle, and being comprised of a sheet metal strip and an overlying plastic strip is provided with internal cavities separared by ribs.

13. Wind deflector for sliding roofs of motor vehicles, said deflector being mountable near the forward edge of a roof opening so that it is swivelable near its forward edge about an axis which runs at right angles to the lengthwise axis of the vehicle, and being comprised of a sheet metal strip and an overlying plastic strip connected thereto, characterized by the fact that the sheet metal strip is provided with reinforcing fins, wherein said fins are laterally extending corrugations of the metal strip positions within chambers formed internally of the plastic strip.

14. Wind deflector according to claim 13, wherein the fins are attached to the metal strip at positions corresponding to chambers formed internally of the plastic strip.

* * * * *